(12) United States Patent
Xue et al.

(10) Patent No.: US 9,167,410 B1
(45) Date of Patent: Oct. 20, 2015

(54) POLICY-BASED ROAMING CONTROL FOR WIRELESS COMMUNICATION DEVICES

(71) Applicant: Sprint Communications Company L.P., Overland Park, KS (US)

(72) Inventors: Wen Xue, Overland Park, KS (US); Sean Murphy Walton, Philomont, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 118 days.

(21) Appl. No.: 14/136,922

(22) Filed: Dec. 20, 2013

(51) Int. Cl.
    *H04W 8/06* (2009.01)
    *H04W 8/02* (2009.01)
    *H04W 12/06* (2009.01)

(52) U.S. Cl.
    CPC ............. *H04W 8/02* (2013.01); *H04W 12/06* (2013.01)

(58) Field of Classification Search
    CPC ....................................................... H04W 8/06
    USPC ...................................................... 455/432.1
    See application file for complete search history.

(56) References Cited

U.S. PATENT DOCUMENTS

| | | | |
|---|---|---|---|
| 5,862,471 A * | 1/1999 | Tiedemann et al. | 455/406 |
| 7,778,638 B2 * | 8/2010 | Shon | 455/433 |
| 7,881,699 B2 * | 2/2011 | Jones | 455/411 |
| 8,275,355 B2 * | 9/2012 | Huang et al. | 455/410 |
| 2001/0031636 A1 * | 10/2001 | Hanson | 455/432 |
| 2002/0058506 A1 * | 5/2002 | Amin et al. | 455/432 |
| 2008/0301782 A1 * | 12/2008 | Han et al. | 726/4 |
| 2009/0047947 A1 | 2/2009 | Giaretta et al. | |

FOREIGN PATENT DOCUMENTS

WO    2012095197    7/2012

* cited by examiner

*Primary Examiner* — Christopher M Brandt (57) ABSTRACT

Systems, methods, and software for controlling roaming of wireless communication devices onto wireless communication networks are provided herein. In one example, method of operating a wireless communication network is provided. The method includes, during a communication session initiation process between the wireless communication device and the roaming wireless communication network, receiving a request for policy information for the wireless communication device. Responsive to the request for the policy information, the method includes identifying a network address of a roaming gateway serving the wireless communication device and a paging tracking area identifier for the wireless communication device in the roaming wireless communication network. The method includes processing the network address and the paging tracking area identifier to determine a roaming authorization status for the communication session, and transferring the roaming authorization status for delivery to the roaming wireless communication system.

20 Claims, 5 Drawing Sheets

POLICY-BASED ROAMING CONTROL FOR WIRELESS COMMUNICATION DEVICES

TECHNICAL FIELD

Aspects of the disclosure are related to the field of communications, and in particular, control of wireless communication devices in roaming onto wireless communication networks.

TECHNICAL BACKGROUND

Wireless communication systems, such as cellular voice and data networks, typically include multiple wireless access nodes spread over a geographic area through which wireless communication devices can register and receive wireless access to communication services. In many examples, the wireless communication devices are mobile, and can move between wireless coverage areas of the wireless access nodes. Across geographic regions, such as cities and rural areas, wireless coverage areas associated with more than one wireless service provider overlap and provide similar communication services.

These various wireless communication networks can allow a wireless communication device which receives wireless service from a home wireless network operator to also receive service from non-home, or "roaming," wireless network operators via roaming agreements. However, these roaming agreements are typically broad agreements that allow a wireless communication device to roam anywhere on the roaming wireless communication network. When coverage areas of both a home and roaming wireless communication network overlap, a wireless communication device might seek roaming services while still in a coverage area of a home wireless network, such as due to fluctuating radio frequency (RF) conditions or other factors, which can lead to increased and unnecessary roaming costs.

Overview

Systems, methods, and software for controlling roaming of wireless communication devices onto wireless communication networks are provided herein. In one example, method of operating a wireless communication network is provided. The method includes, during a communication session initiation process between the wireless communication device and the roaming wireless communication network, receiving a request for policy information for the wireless communication device. Responsive to the request for the policy information, the method includes identifying a network address of a roaming gateway serving the wireless communication device and a paging tracking area identifier for the wireless communication device in the roaming wireless communication network. The method includes processing the network address and the paging tracking area identifier to determine a roaming authorization status for the communication session, and transferring the roaming authorization status for delivery to the roaming wireless communication system.

In another example, a wireless communication network configured to authorize roaming communications of a wireless communication device onto a roaming wireless communication network is provided. The wireless communication network includes a gateway node configured to receive a request for policy information for the wireless communication device during a communication session initiation process between the wireless communication device and the roaming wireless communication network. Responsive to the request for the policy information, a policy node is configured to identify a network address of a gateway serving the wireless communication device and a paging tracking area identifier for the wireless communication device in the roaming wireless communication network. The policy node is configured to process the network address and the paging tracking area identifier to determine a roaming authorization status for the communication session. The gateway node is configured to transfer the roaming authorization status for delivery to the roaming wireless communication system.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
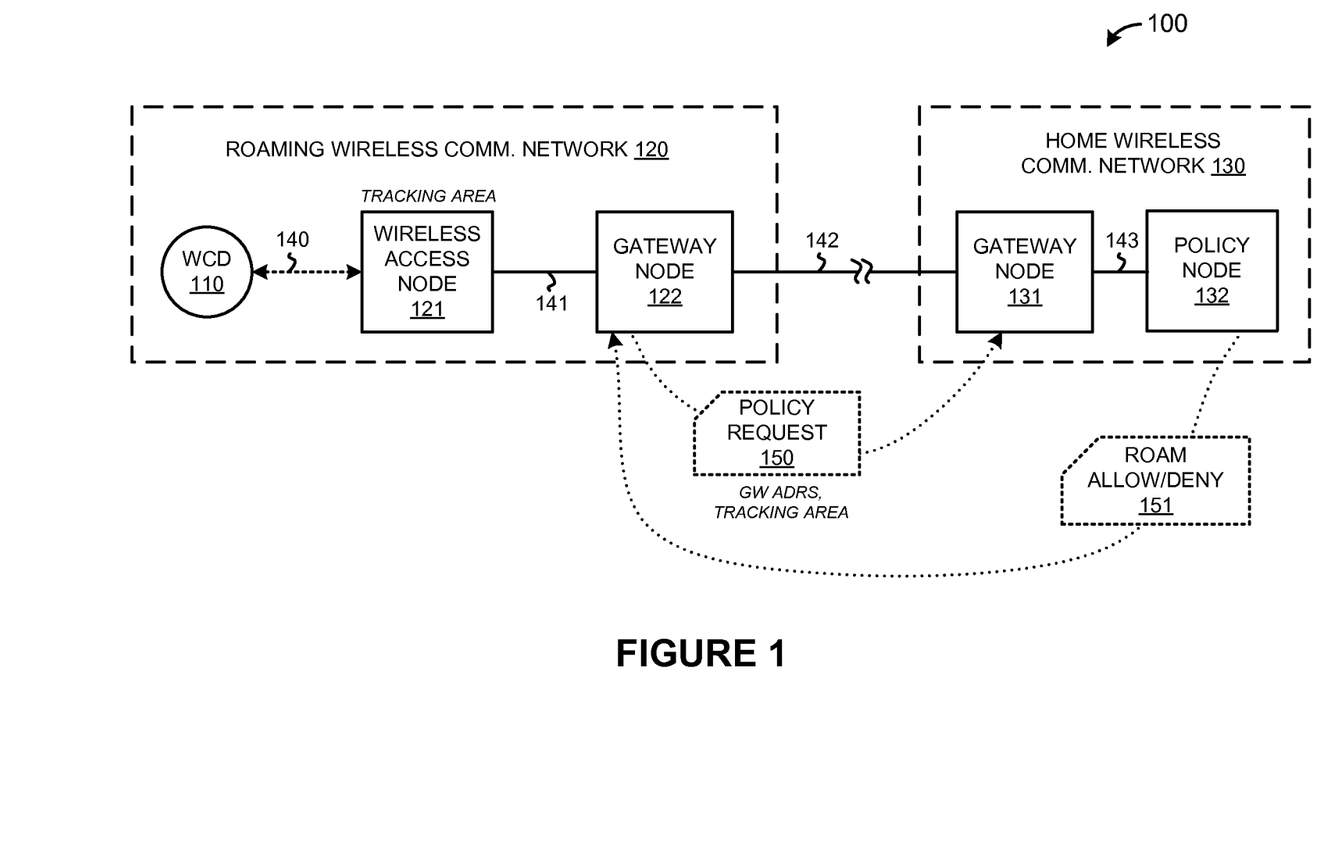
FIG. 1 is a system diagram illustrating a communication system.

FIG. 1 is a system diagram illustrating communication system 100. Communication system 100 includes wireless communication device (WCD) 110, roaming wireless communication network 120, and home wireless communication network 130. WCD 110 receives wireless access to communication services over wireless link 140. Roaming wireless communication network 120 and home wireless communication network 130 communicate over link 142.

Roaming wireless communication network 120 includes wireless access node 121 and gateway node 122. Wireless access node 121 and gateway node 122 communicate over link 141. Gateway node 122 can communicate over link 142 with other systems, such as elements of home wireless communication system 130. Wireless access node 121 can provide wireless access to communication services for wireless communication devices, such as WCD 110. In this example, wireless access node 121 provides roaming wireless access to WCD 110, where WCD 110 is 'visiting' onto roaming wireless communication network 120 and wireless communication network 130 is a home wireless communication network of WCD 110.

Home wireless communication network 130 includes gateway node 131 and policy node 132. Gateway node 131 and policy node 132 communicate over link 143. Gateway node 131 can communicate over link 142 with other systems, such as elements of roaming wireless communication network 120. Gateway node 131 can comprise different equipment and systems than gateway node 122. Although not shown in FIG. 1 for clarity, home wireless communication network 120 can include wireless access nodes for providing wireless access to communication services for wireless communication devices, such as WCD 110.

Figure 2:
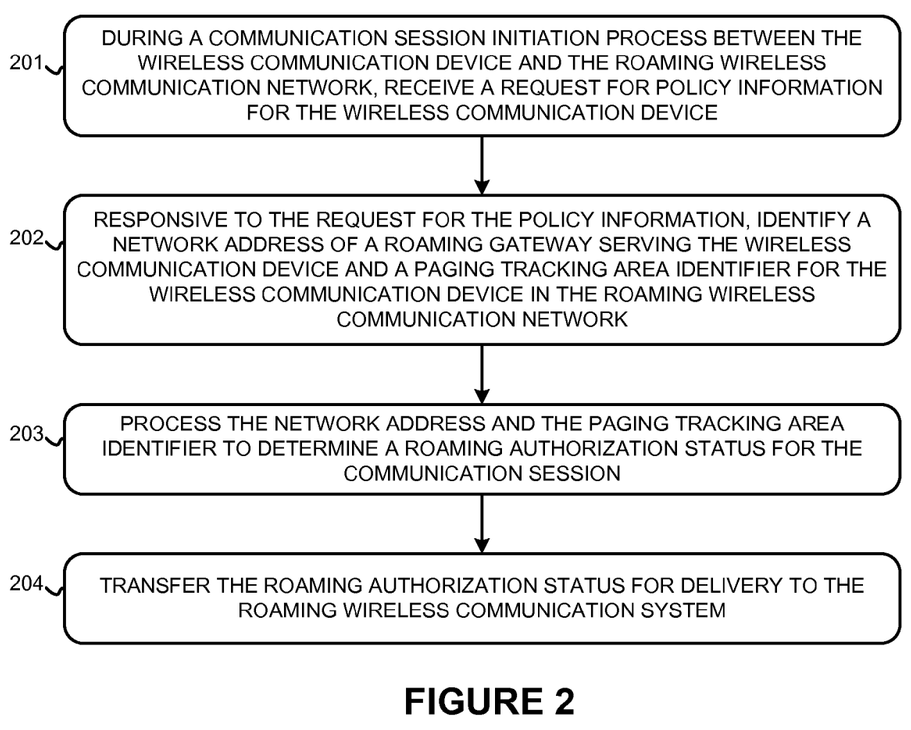
FIG. 2 is a flow diagram illustrating a method of operation of a communication system.

To illustrate an example operation of FIG. 1, FIG. 2 is presented. FIG. 2 is a flow diagram illustrating a method of operation of FIG. 1. The operations of FIG. 2 are referenced herein parenthetically. In FIG. 2, during a communication session initiation process between WCD 110 and roaming wireless communication network 120, gateway node 131 receives (201) a request for policy information for WCD 110. The request for policy information, as shown by policy request 150, can include a request for account information, quality-of-service information, or other information on what level of service roaming wireless communication network 120 should give WCD 110, and can be based on a level of service purchased by a user of WCD 110, among other variations. Typically, roaming wireless communication network 120 does not store account information or quality of service information that is specific to WCD 110, since roaming wireless communication network 120 is not the native or home service provider of WCD 110. This policy information is stored or maintained by a home wireless communication network, such as by policy node 132 in home wireless communication network 130.

The communication session initiation process can include WCD 110 requesting to initiate a communication session, such as a voice call, data session, text message, multimedia session, or other communication session. In typical examples, the communication session initiation process occurs after WCD 110 has already attached to roaming wireless communication network 120. The attachment process can include a roaming authentication process to ensure that WCD 110 is allowed to roam onto roaming wireless communication network 120. However, the attachment process does not typically authorize roaming in a particular geographic location, and instead merely authenticates WCD 110 for roaming into any wireless coverage areas of roaming wireless communication network 120. The attachment process also does not typically authorize a particular communication session, and instead authorizes all communication sessions for a particular wireless communication device.

Responsive to the request for the policy information, gateway node 131 identifies (202) a network address of a roaming gateway serving WCD 110 and a paging tracking area identifier for WCD 110 in roaming wireless communication network 120. In this example, the roaming gateway serving WCD 110 is gateway node 122, and thus the network address associated with gateway node 122 is identified by gateway node 131. This network address can include a network identifier, such as an Internet protocol (IP) address, and can be used to reach gateway node 122 over a network using an associated network protocol. The network address can be identified by inspecting policy request 150, such as by identifying a network address associated with policy request 150. Wireless access node 121 is also associated with a particular tracking area. A tracking area indicates a particular geographic area that paging information is distributed to by a wireless network, such as within roaming wireless communication network 120. For example, when paging information is intended for delivery to a particular wireless communication device, the paging information is not broadcast over an entire wireless network, and instead is only delivered to a grouping of one or more wireless access nodes that comprise a tracking area. The paging information can include call notifications, text messages, network alerts, or other information.

Policy node 132 processes (203) the network address and the paging tracking area identifier to determine a roaming authorization status for the communication session. In this example, the network identifier of gateway node 122 and the tracking area of wireless access node 121 is provided to policy node 132 over link 143, and policy node 132 processes the network address and the paging tracking area identifier to determine a roaming authorization status for the communication session. The network address and the paging tracking area identifier can be processed to identify a geographic location of WCD 110, or an estimate of the geographic location of WCD 110. The roaming authorization status for the communication session can include allowing or denying roaming for WCD 110 for the communication session, and can be indicated in a response to the policy request, such as indicated by roam allow/deny message 151. Policy node 132 transfers (204) the roaming authorization status for delivery to roaming wireless communication system 120.

Figure 3:
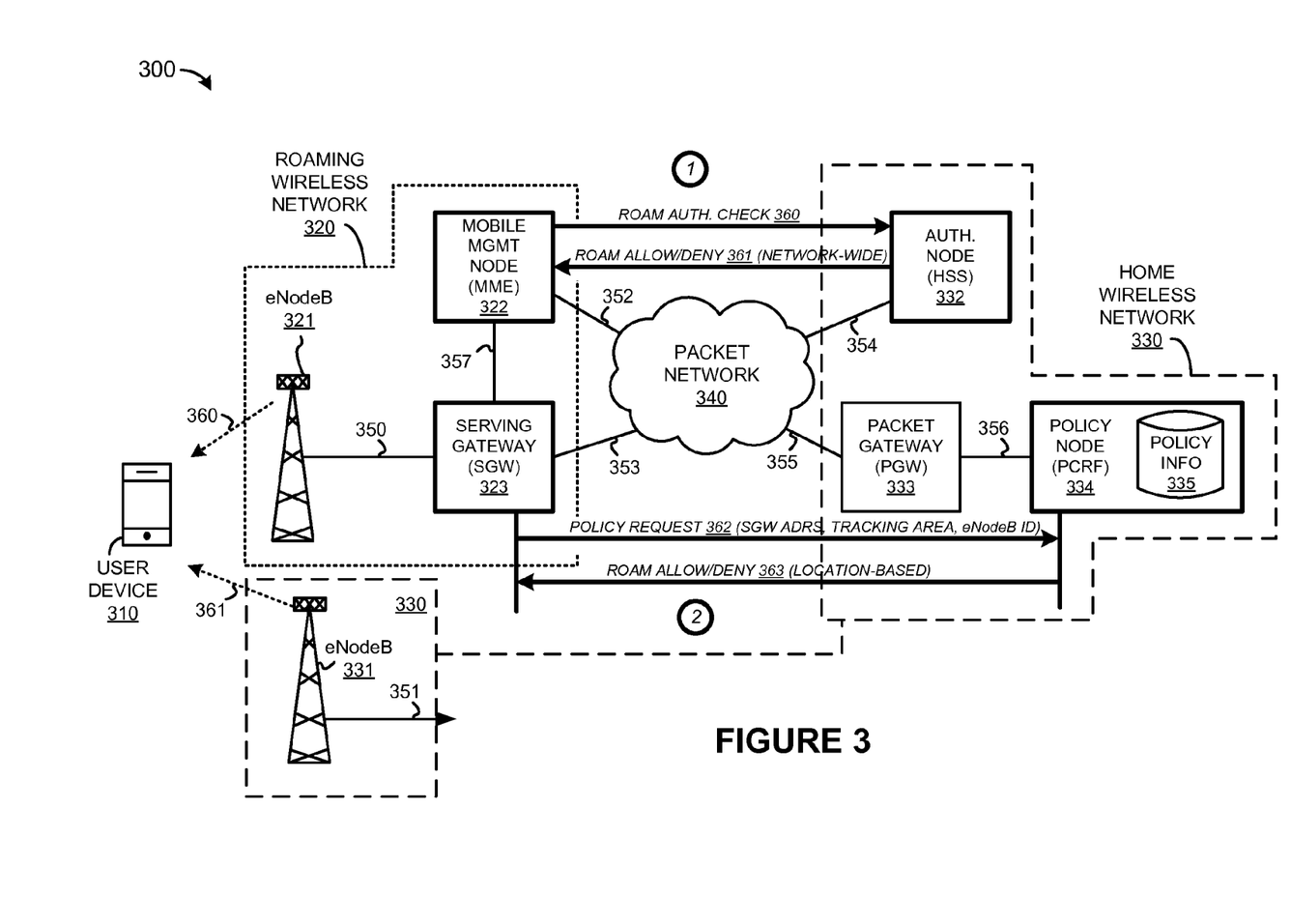
FIG. 3 is a system diagram illustrating a communication system.

FIG. 3 is a system diagram illustrating communication system 300. Communication system 300 includes user device 310, roaming wireless network 320, home wireless network 330, and packet network 340. Roaming wireless network 320 is a roaming network from the perspective of user device 310, while home wireless network 320 is a home network from the perspective of user device 310. Roaming wireless network 320 and home wireless network 330 communicate over packet network 340, such as over links 352-355, which are Internet protocol (IP) links in this example. In some examples, links 352-353 are combined into a single link, while links 354-355 are combined into a single link.

Roaming wireless network 320 comprises a Long-Term Evolution (LTE) cellular voice and data communication network in this example, and includes Evolved Universal Terrestrial Radio Access Network Node B (eNodeB) 321, mobile management node (MME) 322, and serving gateway (SGW) 323. eNodeB 321 and SGW 323 communicate over S1 backhaul link 350, and MME 322 and SGW communicate over S11 network link 357. MME 322 and packet network 340 communicate over IP link 352, and SGW 323 and packet network 340 communicate over IP link 353.

Home wireless network 320 comprises an LTE cellular voice and data communication network in this example, and includes eNodeB 331, home subscriber server authorization node (HSS) 332, packet data network gateway (PGW) 333, and Policy and Charging Rules Function node (PCRF) 334. HSS 332 and packet network 340 communicate over IP link 354, which can include further systems, such as an MME. PGW 333 and packet network 340 communicate over IP link 355. PCRF 334 and PGW 333 communicate over network link 356. Although PGW 333 and PCRF 334 are shown as separate elements communicating over link 356 in this example, portions PGW 333, PCRF 334, or link 356 can be included in similar equipment. It should be understood that further communication links and intermediate systems can be included in FIG. 3.

PCRF 334 also includes policy information 335 in this example. Policy information 335 can include one or more data structures that include policy information stored on a per-user or per-device basis. This policy information can control quality-of-service, level of service, location-based databases for comparing locations of wireless devices to network coverage.

User device 310 can receive wireless access to communication services from either of home wireless network 330 or roaming wireless network 320. In this example, wireless coverage areas associated with both roaming wireless network 320 and home wireless network 330 overlap in a similar physical location, such as a location of user device 310. Specifically, eNodeB 321 of roaming wireless network 320 and eNodeB 331 of home wireless network 330 can provide wireless access to communication services for user device 310. Typically, user device 310 prefers to receive wireless access from a home service provider, specifically, home wireless network 330. However, due to fluctuations in signal quality, bandwidth, quantities of other nearby user devices, loading of eNodeB equipment, or other factors, user device 310 may detect better wireless access is available from roaming wireless network 320, and seek to roam onto roaming wireless network 320.

Figure 4:
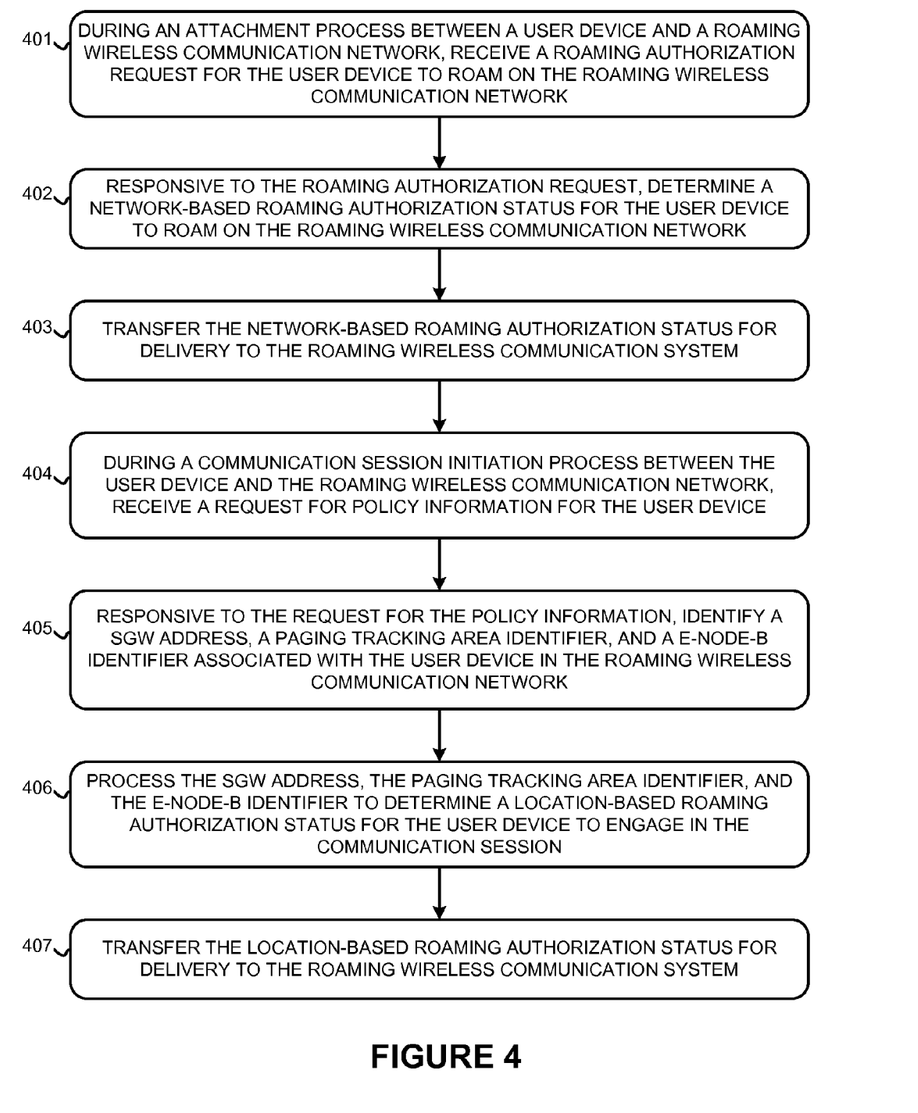
FIG. 4 is a flow diagram illustrating a method of operation of a communication system.

To further illustrate the roaming operations of the elements of FIG. 3, FIG. 4 is presented. FIG. 4 is a flow diagram illustrating a method of operating communication system 300. The operations of FIG. 4 are referenced below parenthetically. In FIG. 4, during an attachment process between a user device and a roaming wireless communication network, home wireless network 330 receives (401) a roaming authorization request for user device 310 to roam on the roaming wireless communication network. Before user device 310 can roam onto roaming wireless network 320, an attachment process is performed. During this attachment process, a roaming authorization check is performed that authorizes or verifies user device 310 is authorized to roam onto roaming wireless network 320. However, this attachment process is non-specific about the physical location that user device 310 is presently located within roaming wireless network 320. The attachment process and roaming authorization merely authorize user device 310 to roam onto any portion of roaming wireless network 320, such as handled by a roaming agreement between roaming wireless network 320 and home wireless network 330, or user device 310 having a valid subscription for service with home wireless network 320.

As shown in FIG. 3, roaming authorization check 360 is requested between MME 322 and HSS 332. Responsive to the roaming authorization request of roaming authorization check 360, HSS 332 determines (402) a network-based roaming authorization status for the user device to roam on roaming wireless network 320. HSS 332 then transfers (403) the network-based roaming authorization status for delivery to MME 322 of roaming wireless network 320. As shown in FIG. 3, roam allow/deny message 361 is transferred for delivery to MME 322 by HSS 332, which indicates a network-wide roaming authorization for user device 310 on roaming wireless network 320.

In some examples, user device 310 might be denied roaming onto roaming wireless network 320 during the attachment process, such as when roaming wireless network 320 and home wireless network 330 do not have a roaming agreement, or when user device 310 is not a current subscriber of home wireless network 330. However, in this example, user device is allowed to roam onto roaming wireless network 320 by HSS 332. After attachment, user device 310 typically desires to engage in a communication session over roaming wireless network 320, such as to engage in a voice call, data session, text messaging, or other communication session. Before the communication session occurs, roaming wireless network 320 can check with home wireless network 330 for policy information related to the quality of service, level of service, usage charge rate, among other policy information specific to user device 310 or a user of user device 310.

Thus, during a communication session initiation process between user device 310 and roaming wireless network 320, home wireless network 330 receives (404) a request for policy information for user device 310. The policy request is shown in FIG. 3 as policy request 362, which is transferred by SGW 323 for receipt by PGW 333. Responsive to policy request 362, PGW 333 identifies (405) a SGW address, a paging tracking area identifier, and an eNodeB identifier associated with user device 310 in the roaming wireless network 320. In this example, policy request 362 is accompanied by an indication of a network address of SGW 323, a tracking area that user device 310 is presently in, and an identity of eNodeB 321. In some examples, PGW 333 requests some of this information from SGW 323, while in other examples, this information is provided in policy request 362. In yet further examples, PGW 333 determines this information by analyzing packets of policy request 362 to identify a network address of SGW 323.

A tracking area indicates a particular geographic area that paging information is distributed to by a wireless network, such as within roaming wireless network 320. A tracking area can include a plurality of eNodeBs, such as 25 eNodeBs. When paging information is intended for delivery to a particular user device, the paging information is not broadcast over an entire wireless network, and instead is only delivered to a grouping of one or more eNodeBs that comprise the tracking area. The paging information can include call notifications, text messages, network alerts, or other information.

Once the SGW address, paging tracking area identifier, and eNodeB identifier associated with user device 310 in the roaming wireless network 320 has been identified, this information is transferred to PCRF 334 over link 356. PCRF 334 processes (406) the SGW address, paging tracking area identifier, and eNodeB identifier to determine a location-based roaming authorization status for user device 310 to engage in the communication session. Although user device 310 has already been authorized to attach and roam onto roaming wireless network 320, home wireless network 330 may not desire user device 310 to engage in roaming communications over roaming wireless network 320. For the example shown in FIG. 3, user device 310 is served by at least eNodeB 321 and eNodeB 331. Home wireless network 330 prefers user device 310 receive wireless access from eNodeB 331 to avoid roaming charges and limit usage on a roaming network. However, due to fluctuations in signal quality, bandwidth, quantities of other nearby user devices, loading of eNodeB equipment, or other factors, user device 310 may detect better wireless access is available from eNodeB 321 of roaming wireless network 320, and seek to roam onto roaming wireless network 320.

The SGW address, paging tracking area identifier, and identifier of eNodeB 321 are processed to determine a geographic location of user device 310. If this location is identified to be in a location where both roaming wireless network 320 and home wireless network 330 have overlapping coverage, or in a location where wireless coverage from home wireless network 330 should typically be available, then home wireless network 330 may not want user device 310 to engage in roaming communications over roaming wireless network 320. PCRF 334 can determine that user device 310 should be denied roaming communications through roaming wireless network 320 and eNodeB 321 to allow time for the fluctuations in conditions around eNodeB 331 to improve or change. This roaming denial can force user device 310 to seek out other eNodeBs in the vicinity, such as eNodeB 331, and handover from eNodeB 321 to eNodeB 331 or other eNodeB equipment of home wireless network 330. In locations or times where home wireless network 330 does not have sufficient wireless coverage, or where roaming is acceptable for user device 310, then PCRF 334 can determine that user device 310 should be allowed roaming communications through roaming wireless network 320 and eNodeB 321.

To determine a location of user device 310 compared to elements of roaming wireless network 320 and elements of home wireless network 330, PCRF can reference data structures stored in policy information 335. Information 335 can include a database that can be referenced to locate SGW addresses, paging tracking area identifiers, and identifiers of eNodeBs of roaming wireless network 320 to geographic regions, such as coverage sectors, neighborhoods, cities, or states, and compare these locations to an estimated location of user device 310. The estimated location of user device 310 can be based on the SGW address, paging tracking area identifier, and identifier of eNodeB 321. This estimated location can be a coarse location estimation due to the lack of geographic coordinates obtained directly from user device 310. However, the coarse estimation can be accurate enough to determine if user device 310 is in an area served by home wireless network 330. Other location-based determinations are possible.

Once the location-based roaming authorization status, namely the roaming allow/deny decision, has been determined by PCRF 334, then PCRF 334 transfers (407) a location-based roaming authorization status for delivery to roaming wireless system 330. Specifically, a response to the policy request, namely roam allow/deny message 363 is transferred for delivery to SGW 323. Message 363 can include a policy indication that denies or allows user device 310 to engage in roaming communications. A denial policy indication can include an indication of a zero level of service, a low quality of service, a zero-balance on an account associated with user device 310, or other policy indications that prompt roaming wireless network 320 to deny or restrict roaming communications requested by user device 310.

In further examples, the fluctuation in conditions which prompts user device 310 to seek roaming communications from roaming wireless network 320 might include eNodeB 331 or other equipment of home wireless network 330 becoming unavailable due to a network failure, power outage, or other condition which precludes home wireless service. In this example, the denial of roaming communications onto roaming wireless network 320 can force user device 310 to fall back to a lower-generation of wireless protocol or wireless technology. Specifically, if eNodeB 331 is a fourth-generation (4G) wireless access node, and other third-generation (3G) or lower equipment is available in the vicinity of user device 310, then when user device 310 is denied roaming onto 4G roaming wireless network 320, user device might seek out 3G service from home wireless network 330. This can prevent roaming when temporary conditions or wireless coverage conditions would normally prompt user device 310 to seek roaming communication services.

In yet further examples, responsive to the roaming authorization status indicating a denied roaming authorization, PCRF 334 can establish a blocking timer to prevent authorization of roaming communication sessions for user device 310 on roaming wireless network 320 for a predetermined period of time. This blocking timer can be maintained by PCRF 334 in policy information 335, and ensure that rapid requests for roaming communication sessions for user device 310 on roaming wireless network 320 are continually denied roaming authorization until the blocking timer expires. The blocking timer can be a predetermined time, such as a quantity of minutes or seconds.

Figure 5:
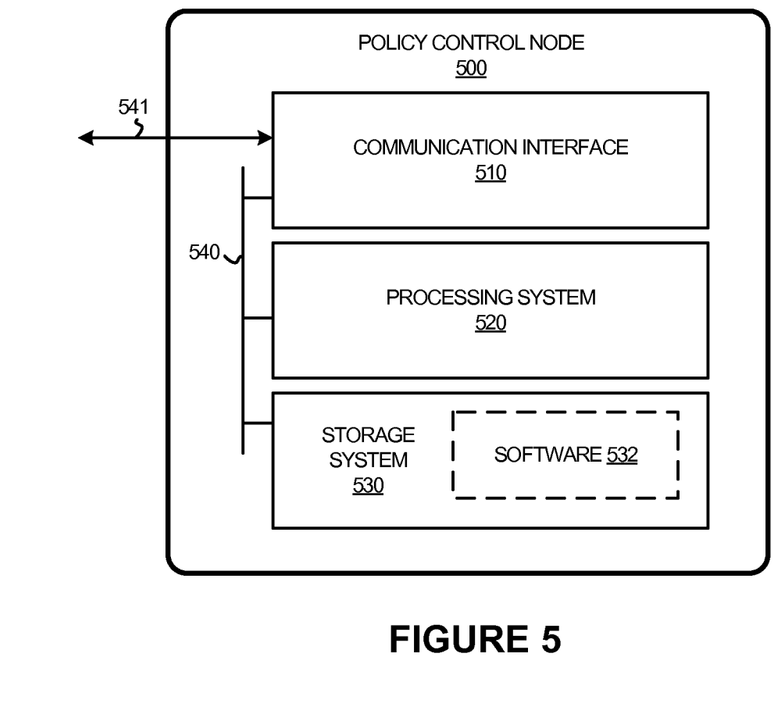
FIG. 5 is a block diagram illustrating a policy control node.

FIG. 5 is a block diagram illustrating a detailed view of policy control node 500. Policy control node 500 can include equipment and systems as discussed herein for policy node 132 in FIG. 1 and PCRF 334 in FIG. 3, although variations are possible. Policy control node 500 includes communication interface 510, processing system 520, and storage system 530. In operation, processing system 520 is operatively linked to communication interface 510 and storage system 530 by bus 540. It should be understood that discrete links can be employed, such as network links or other circuitry. Policy control node 500 can be distributed or consolidated among equipment or circuitry that together forms the elements of policy control node 500. Policy control node 500 can optionally include additional devices, features, or functionality not discussed here for purposes of brevity.

Communication interface 510 includes a network interface for communicating over communication networks, such as wireless communication network 130 of FIG. 1. The network interface can include an Ethernet interface, or other local or wide area network communication interfaces which can communicate over a communication link. Examples of communication interface 510 include network interface card equipment, transceivers, modems, and other communication circuitry. In this example, communication interface 510 communicates over link 541. Link 541 can include any communication link as described herein, such as that described for link 143 in FIG. 1.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by policy control node 500 in general or processing system 520 in particular, direct policy control node 500 or processing system 520 to receive a request for policy information for a wireless communication device, responsive to the request for the policy information, identify at least a network address of a gateway serving the wireless communication device and a paging tracking area identifier for the wireless communication device in a roaming wireless communication network, process at least the network address and the paging tracking area identifier to determine a roaming authorization status for the communication session, and transfer the roaming authorization status for delivery to a roaming wireless communication system, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to receive a request for policy information for a wireless communication device, responsive to the request for the policy information, identify at least a network address of a gateway serving the wireless communication device and a paging tracking area identifier for the wireless communication device in a roaming wireless communication network, process at least the network address and the paging tracking area identifier to determine a roaming authorization status for the communication session, and transfer the roaming authorization status for delivery to a roaming wireless communication system, among other operations.

In general, software 532 can, when loaded into processing system 520 and executed, transform processing system 520 overall from a general-purpose computing system into a special-purpose computing system customized to receive a request for policy information for a wireless communication device, responsive to the request for the policy information, identify at least a network address of a gateway serving the wireless communication device and a paging tracking area identifier for the wireless communication device in a roaming wireless communication network, process at least the network address and the paging tracking area identifier to determine a roaming authorization status for the communication session, and transfer the roaming authorization status for delivery to a roaming wireless communication system, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Policy control node 500 can also include other elements, such as user interfaces, computer systems, databases, distributed storage and processing elements, and the like. Policy control node 500 can be included in the equipment or systems of wireless communication network 130 or gateway node 131 of FIG. 1, or can be included in separate equipment or systems, including combinations thereof.

Referring back to FIG. 1, wireless communication device 110 comprises one or more antennas, transceiver circuitry elements, and communication elements. The transceiver circuitry typically includes amplifiers, filters, modulators, and signal processing circuitry. Wireless communication device 110 can also include user interface systems, memory devices, non-transitory computer-readable storage mediums, software, processing circuitry, or some other communication components. Wireless communication device 110 can be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Roaming wireless communication network 120 and home wireless communication network 130 each comprise communication and control systems for providing access to communication services for user devices and networks. Roaming wireless communication network 120 and home wireless communication network 130 can each provide communication services including communication routing, link bridging, network communications, data exchange, or other communication services. In some examples, roaming wireless communication network 120 and home wireless communication network 130 are each a cellular voice and data network that can provide voice calls, text messages, data access, or other communication services provided over cellular or wireless communication networks. In some examples, roaming wireless communication network 120 and home wireless communication network 130 each include equipment to provide wireless access to communication services within different coverage areas to user devices, route communications between content providers and user devices, and facilitate handoffs between equipment of different coverage areas, among other operations. Roaming wireless communication network 120 and home wireless communication network 130 can also each comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Policy and Charging Rules Function nodes (PCRF), packet data network gateways (PGW), serving gateways (SGW), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Wireless access node 121 is associated with roaming wireless communication network 120, and provides wireless link 140 for wireless access to the communication services of roaming wireless communication network 120 within a geographic area. Wireless access node 121 comprises RF communication and control circuitry, transceivers, and antennas, as well as wireless communications equipment capable of communicating with and providing wireless access within a wireless coverage area to communication services for wireless communication devices, such as wireless communication device 110. The RF communication circuitry typically includes amplifiers, filters, RF modulators, transceivers, and signal processing circuitry. Wireless access node 110 can also comprise elements such as base stations, base transceiver stations (BTS), E-UTRAN Node B equipment, eNodeB equipment, Evolved Node B equipment, Evolved Universal Terrestrial Radio Access (E-UTRA) network equipment.

Gateway node 122 and gateway node 131 each comprise routing, gateway, and network interfacing equipment. Gateway node 122 and gateway node 131 each handle the transfer of network traffic for user devices, such as WCD 110, between other networks or systems. In some examples, gateway node 122 and gateway node 131 each can include computer processing systems and equipment, communication or network interfaces, as well as computer systems, microprocessors, circuitry, cloud-based systems, or some other processing devices or software systems, and can be distributed among multiple processing devices. Examples of gateway node 122 and gateway node 131 can also each include software such as an operating system, logs, databases, utilities, drivers, networking software, and other software stored on a computer-readable medium Policy node 132 comprises computer processing systems and equipment. Policy node 132 can include communication or network interfaces, as well as computer systems, microprocessors, circuitry, cloud-based systems, or some other processing devices or software systems, and can be distributed among multiple processing devices. Examples of policy node 132 can also include software such as an operating system, logs, databases, utilities, drivers, networking software, and other software stored on a computer-readable medium.

Communication links 141-143 each use metal, glass, optical, air, space, or some other material as the transport media. Communication links 141-143 can each use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication links 141-143 can each be a direct link or can include intermediate networks, systems, or devices, and can include a logical network link transported over multiple physical links. Communication links 141-143 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Communication link 140 includes one or more wireless links, and use the air or space as the transport media. Communication link 140 comprises one or more wireless communication links provided over an associated wireless frequency spectrum or wireless frequency band, and can use various protocols. In this example, communication link 140 can each comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 140-143 is shown in FIG. 1, it should be understood that links 140-143 are merely illustrative to show communication modes or access pathways. In other examples, further links can be shown, with portions of the further wireless links shared and used for different communication sessions or different content types, among other configurations.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication network to authorize roaming communications of a wireless communication device onto a roaming wireless communication network, the method comprising:

during a communication session initiation process between the wireless communication device and the roaming wireless communication network, receiving a request for policy information for the wireless communication device;

responsive to the request for the policy information, identifying a network address of a gateway serving the wireless communication device and a paging tracking area identifier for the wireless communication device in the roaming wireless communication network;

processing the network address and the paging tracking area identifier to determine a roaming authorization status for the communication session; and transferring the roaming authorization status for delivery to the roaming wireless communication system.

2. The method of claim 1, wherein processing the network address and the paging tracking area identifier to determine the roaming authorization status for the communication session comprises determining a location within the roaming wireless communication network based on the network address and the paging tracking area identifier, and determining the roaming authorization status based on at least the location within the roaming wireless communication network.

3. The method of claim 2, wherein the roaming authorization status indicates a denied roaming authorization when the wireless communication device is located within a coverage area associated with the wireless communication network.

4. The method of claim 2, wherein the roaming authorization status indicates an allowed roaming authorization when the wireless communication device is not located within a coverage area associated with the wireless communication network.

5. The method of claim 1, further comprising:

during an attachment process between the wireless communication device and the roaming wireless communication system which precedes the communication session initiation process, receiving a roaming authentication request from the roaming wireless communication system, and transferring a response to the roaming authentication request allowing the wireless communication device to attach onto the roaming wireless communication system.

6. The method of claim 5, wherein the roaming authorization status for the communication session indicates a denied roaming authorization.

7. The method of claim 1, wherein the gateway serving the wireless communication device comprises a serving gateway (SGW) of the roaming wireless communication network, and wherein receiving the request for the policy information for the wireless communication device comprises receiving the request in a packet data network gateway (PGW) of the wireless communication network, the wireless communication network comprising a home wireless communication network for the wireless communication device.

8. The method of claim 7, further comprising:
in the PGW, transferring the request for the policy information, the network address, and the paging tracking area identifier to a Policy and Charging Rules Functions (PCRF) of the wireless communication network, and responsively receiving the roaming authorization status from the PCRF indicating an allowed or denied roaming authorization status.

9. The method of claim 1, further comprising:
responsive to the request for the policy information, identifying a wireless access node identifier of a wireless access node to which the wireless communication device is attached in the roaming wireless communication network; and
processing the wireless access node identifier, the network address, and the paging tracking area identifier to determine the roaming authorization status for the communication session.

10. The method of claim 1, wherein the roaming authorization status indicates a denied roaming authorization when the wireless communication device is located within a coverage area associated with the wireless communication network, and further comprising:
responsive to the roaming authorization status indicating the denied roaming authorization, establishing a blocking timer in the wireless communication network to prevent authorization of roaming communication sessions for the wireless communication device on the roaming wireless communication network for a predetermined period of time.

11. A wireless communication network configured to authorize roaming communications of a wireless communication device onto a roaming wireless communication network, the wireless communication network comprising:
a gateway node configured to receive a request for policy information for the wireless communication device during a communication session initiation process between the wireless communication device and the roaming wireless communication network;
responsive to the request for the policy information, a policy node configured to identify a network address of a gateway serving the wireless communication device and a paging tracking area identifier for the wireless communication device in the roaming wireless communication network;
the policy node configured to process the network address and the paging tracking area identifier to determine a roaming authorization status for the communication session; and
the gateway node configured to transfer the roaming authorization status for delivery to the roaming wireless communication system.

12. The wireless communication network of claim 11, comprising:
the policy node configured to determine a location within the roaming wireless communication network based on the network address and the paging tracking area identifier, and determine the roaming authorization status based on at least the location within the roaming wireless communication network.

13. The wireless communication network of claim 12, wherein the roaming authorization status indicates a denied roaming authorization when the wireless communication device is located within a coverage area associated with the wireless communication network.

14. The wireless communication network of claim 12, wherein the roaming authorization status indicates an allowed roaming authorization when the wireless communication device is not located within a coverage area associated with the wireless communication network.

15. The wireless communication network of claim 11, further comprising:
a subscriber server configured to receive a roaming authentication request from the roaming wireless communication system during an attachment process between the wireless communication device and the roaming wireless communication system which precedes the communication session initiation process, and transfer a response to the roaming authentication request allowing the wireless communication device to attach onto the roaming wireless communication system.

16. The wireless communication network of claim 15, wherein the roaming authorization status for the communication session indicates a denied roaming authorization.

17. The wireless communication network of claim 11, wherein the gateway serving the wireless communication device comprises a serving gateway (SGW) of the roaming wireless communication network, wherein the gateway node comprises a packet data network gateway (PGW) of the wireless communication network, and wherein the wireless communication network comprises a home wireless communication network for the wireless communication device.

18. The wireless communication network of claim 17, comprising:
the PGW configured to transfer the request for the policy information, the network address, and the paging tracking area identifier to a Policy and Charging Rules Functions (PCRF) of the wireless communication network, and responsively receive the roaming authorization status from the PCRF indicating an allowed or denied roaming authorization status.

19. The wireless communication network of claim 11, comprising:
responsive to the request for the policy information, the policy node configured to identify a wireless access node identifier of a wireless access node to which the wireless communication device is attached in the roaming wireless communication network; and
the policy node configured to process the wireless access node identifier, the network address, and the paging tracking area identifier to determine the roaming authorization status for the communication session.

20. The wireless communication network of claim 11, wherein the roaming authorization status indicates a denied roaming authorization when the wireless communication device is located within a coverage area associated with the wireless communication network, and comprising:
responsive to the roaming authorization status indicating the denied roaming authorization, the policy node configured to establish a blocking timer to prevent authorization of roaming communication sessions for the wireless communication device on the roaming wireless communication network for a predetermined period of time.

* * * * *